Patented Mar. 4, 1941

2,233,964

UNITED STATES PATENT OFFICE 2,233,964

CYCLOHEXYLATED DIPHENYL-BENZENES

Frank B. Smith and Harold W. Moll, Midland, Mich., assignors to The Dow Chemical Company, Midland, Mich., a corporation of Michigan No Drawing. Application October 22, 1938, Serial No. 236,558

3 Claims. (Cl. 260—668)

This invention concerns certain new chemical products prepared by reaction between diphenyl-benzene and cyclohexene or other cyclohexylating agent. The new products comprise mixtures of diphenyl-benzene derivatives wherein the diphenyl-benzene is substituted in one or more of the aryl nuclei by one or more cyclohexyl groups, and are herein referred to as "cyclohexylated diphenyl-benzenes." They vary in physical characteristics from soft, semi-solid or wax-like materials to solids of a resinous character, depending upon the number of cyclohexyl groups present in the molecule. They are particularly useful as plasticizing or addition agents for various synthetic plastic compositions and may also be employed as intermediates in the preparation of other new chemical products.

The new cyclohexylated diphenyl-benzenes are preferably prepared by reacting cyclohexene with diphenyl-benzene in the presence of an alkylation catalyst, e. g. aluminum chloride, aluminum bromide, iron chloride, boron trifluoride, activated bleaching earths such as Retrol or Tonsil, etc. If desired, however, other cyclohexylating agents, such as cyclohexyl chloride, cyclohexanol, cyclohexyl bromide, etc., may be employed. The diphenyl-benzene employed as starting material may be a mixture of isomeric diphenyl-benzenes such as is obtained as a by-product in the manufacture of diphenyl, or it may be a purified material comprising a single diphenyl-benzene isomer.

The reactants may be employed in any desired proportions, although the products vary in properties with changes in such proportions. For example, diphenyl-benzene may be reacted with its molecular equivalent of a cyclohexylating agent to produce a mixture comprising mono-cyclohexylated diphenyl-benzenes together with some di-cyclohexylated and other poly-cyclo-hexylated diphenyl-benzenes. The poly-cyclo-hexylated products may be obtained in increased yield by increasing the proportion of the cyclo-hexylating agent employed in such reaction or by cyclohexylating the mono-cyclohexylated compounds obtained from a previous reaction. Ordinarily we prefer to employ approximately 1-4 moles of the cyclohexylating agent per mole of diphenyl-benzene. The proportion of catalyst varies somewhat with the particular reactants employed and the conditions under which the reaction is carried out, but we usually employ between about 0.01 and 0.1 part by weight of catalyst per part of diphenyl-benzene.

The reaction is conveniently carried out by adding the cyclohexylating agent to a heated and well-stirred mixture of diphenyl-benzene and catalyst and thereafter continuing the heating and stirring until reaction is complete. The reaction temperature is usually between about 150° C. and 250° C., although higher temperatures may be employed, particularly when a molecular excess of the cyclohexylating agent is used. The reaction is usually complete in from 3 to 10 hours, although the time may be shortened somewhat by carrying out the reaction under pressure in a closed vessel. When the reaction is complete, the mixture is treated to remove the catalyst and is fractionally distilled under vacuum, whereby there is obtained a series of soft, wax-like, or resinous solids comprising complex mixtures of isomeric and non-uniformly cyclohexylated diphenyl-benzenes. The fraction distilling between about 295° C. and about 310° C. under 5 millimeters pressure is particularly valuable as a plasticizing agent in the preparation of flexible ethyl cellulose films having high tensile strength and good surface hardness.

The following example illustrates one way in which the principle of the invention has been applied, but is not to be construed as limiting the same:

Example 230 grams (1.0 mole) of a mixture of isomeric diphenyl-benzenes obtained as a by-product from the manufacture of diphenyl and having a distillation range of 316° C. to 427° C. and 7 grams (3 per cent by weight of the diphenyl-benzene) of Retrol were placed in a flask fitted with a thermometer, stirrer, and reflux condenser, and were heated to 220° C. to drive off the residual water contained in the Retrol. 82 grams (1.0 mole) of cyclohexene was then added gradually with stirring over a period of 4 hours, after which the temperature was raised to 290° C. for several minutes in order to insure complete reaction. The mixture was then cooled to 150° C. and filtered to remove the catalyst. The cyclohexylated diphenyl-benzene product obtained was a viscous orange liquid which, upon standing at room temperature, slowly solidified to a soft, waxy solid. It was fractionally distilled under vacuum, whereby the following fractions were obtained:—

Table

| Fraction No. | Appearance | Yield, grams | Distillation range, °C. | Approximate freezing point, °C. | Specific gravity 125/125° C. |
|---|---|---|---|---|---|
| 1 | White crystalline solid | 25.0 | 90–235 at 20 mm. pressure | 52 | |
| 2 | White paste-like solid | 34.0 | 235–248 at 20 mm. pressure | 82 | |
| 3 | White waxy solid | 73.5 | 248–280 at 20 mm. pressure | 107 | |
| 4 | Cream-colored waxy solid | 12.5 | 245–265 at 5 mm. pressure | 75 | 1.072 |
| 5 | Yellow waxy solid | 34.4 | 265–285 at 5 mm. pressure | 70 | |
| 6 | Yellow wax | 42.3 | 285–310 at 5 mm. pressure | 110 | 1.061 |
| 7 | Hard yellow wax | 29.5 | 310–355 at 5 mm. pressure | 147 | |
| Residue | Resinous solid | 20.1 | Above 355 at 5 mm. pressure | | |

Other modes of applying the principle of our invention may be employed instead of those explained, change being made as regards the method herein disclosed or the materials employed, provided the product stated by any of the following claims or the equivalent of such stated product be obtained.

We therefore particularly point out and distinctly claim as our invention:

1. A cyclohexylated diphenyl-benzene having the general formula

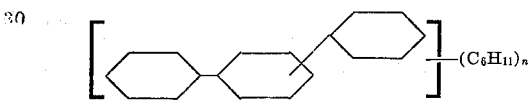

wherein $n$ represents an integer.

2. A mixture consisting substantially of isomeric and nonuniformly cyclohexylated diphenyl-benzenes of the general formula

wherein $n$ represents an integer, said mixture being prepared by reacting a mixture of isomeric diphenyl-benzenes with a cyclohexylating agent in the presence of an alkylation catalyst.

3. A mixture of isomeric cyclohexylated diphenyl-benzenes, said mixture being a wax-like solid distilling at temperatures between about 285° C. and about 310° C. under 5 millimeters pressure, congealing at approximately 110° C., and having a specific gravity of approximately 1.06 at 125/125° C.

FRANK B. SMITH.
HAROLD W. MOLL.